United States Patent [19]
Miura et al.

[11] Patent Number: 5,564,339
[45] Date of Patent: Oct. 15, 1996

[54] ARTICLE CARRYING APPARATUS

[75] Inventors: Shinya Miura; Michikazu Miyamoto, both of Yawara-mura, Japan

[73] Assignee: SMC Corporation, Tokyo, Japan

[21] Appl. No.: 591,691

[22] Filed: Jan. 25, 1996

Related U.S. Application Data

[63] Continuation of Ser. No. 319,594, Oct. 7, 1994.

[30] Foreign Application Priority Data

Oct. 8, 1993 [JP] Japan .................................. 5-277881
Jul. 25, 1994 [JP] Japan .................................. 6-192896

[51] Int. Cl.⁶ .................................................. B61B 13/10
[52] U.S. Cl. .................................. 104/156; 104/138.1
[58] Field of Search .................................. 104/156, 138.1, 104/138.2; 105/365; 198/619

[56] References Cited

U.S. PATENT DOCUMENTS 4,457,423 7/1984 Stoll ...................................... 104/156 X
4,645,182 2/1987 Stoll ...................................... 104/156 X
5,388,526 2/1995 Imai ...................................... 104/138.1

*Primary Examiner*—Robert J. Oberleitner
*Assistant Examiner*—Kevin D. Rutherford
*Attorney, Agent, or Firm*—Oblon, Spivak, McClelland, Maier & Neustadt, P. C.

[57] ABSTRACT

An article carrying apparatus for carrying an article by utilizing pressure of fluid such as compressed air, comprising a cylinder tube, a guide rail extending along the cylinder tube, a piston movable by an action of fluid pressure in said the cylinder tube, a moving piece for carrying an article supported in a manner that its movement is restricted in all directions except in an axial direction by the guide rail and movable in the axial direction along the guide rail and the cylinder tube, and a magnet coupling mounted on each of the moving piece and said piston, whereby the cylinder tube and the said guide rail are arranged as independent members and are connected each other by a connecting mechanism with a degree of freedom.

4 Claims, 6 Drawing Sheets

ARTICLE CARRYING APPARATUS

This is a continuation of application Ser. No. 08/319,594 filed on Oct. 7, 1994.

BACKGROUND OF THE INVENTION

1. Field of the Invention

The present invention relates to an article carrying apparatus for carrying articles by utilizing pressure of fluid such as compressed air.

2. Description of the Related Art

An article carrying apparatus of this type is described, for example, in Japanese Utility Model Laid-Open Publication 60-110169. This apparatus comprises a cylinder tube of a given length, a piston movably arranged in the cylinder tube, a moving piece freely moving along an outer peripheral surface of the cylinder tube, and a magnet coupling each mounted on the piston and the moving piece and attracting each other. When an article is held by the moving piece in this article carrying apparatus and the piston is moved by supplying and discharging pressure fluid to and from the cylinder tube, the moving piece is moved after the piston by attracting force of the magnet couplings, and the article is moved.

It is important in the article carrying apparatus of this type that the moving piece is not deviated upward, downward, leftward or rightward due to the weight of the article to be carried or that it is not tilted due to the center of gravity of the article. If such deviation or tilting occurs, it is not possible to ensure smooth movement of the moving piece and this causes trouble in carrying the article.

In this respect, it is essential that the moving piece is moved always in a stable posture. For this purpose, it is desirable to support the moving piece on a guide, which extends along the cylinder tube, thereby limiting its movement in the upward, downward, leftward and rightward directions and also preventing it from tilting and that the moving piece is moved along the guide and the cylinder tube under this condition.

However, when the moving piece is supported on the guide in such a manner that its movement is restricted in all directions except the axial direction, the moving piece may be caught by the guide or the cylinder tube and may not move further if there is an error in a manufacturing dimension or on assembling dimension of each component in case where the guide and the cylinder tube are independently manufactured and assembled because the moving piece is closely fitted to the cylinder tube and its movement is restricted in all directions except the axial direction.

SUMMARY OF THE INVENTION

It is a principal object of the present invention to provide an article carrying apparatus, in which a moving piece can be smoothly moved always in stable posture.

It is another object of the present invention to provide an article carrying apparatus, by which it is possible to prevent wear of a guiding means for supporting and guiding a moving piece and to increase durability.

To attain the above objects, the article carrying apparatus of the present invention comprises a cylinder tube having a given length, a guide rail extending along the cylinder tube, a piston freely movable by an action of pressure of fluid in the cylinder tube, a moving piece positioned on and striding over the cylinder tube and supported on the guide rail by a guiding means, its movement being restricted in all directions except the axial direction and freely movable in the axial direction along the guide rail and the cylinder tube, and a magnet coupling each mounted on the moving piece and the piston and attracting each other, whereby the cylinder tube and the guide rail are arranged independently as separate components and are connected with each other by a connecting mechanism having some degree of freedom.

In an embodiment of the present invention, the connecting mechanism for connecting the cylinder tube and the guide rail comprises a connection groove formed in the axial direction on an upper surface of the guide rail and having a wider inner groove width, and a connection wall formed in the axial direction on a lower surface of the cylinder tube and having a wider wall width at its tip, and the connection wall is engaged in said connection Groove with a gap between them.

In a preferred embodiment of the present invention, the guiding means comprises a V-shaped guide groove formed in the axial direction on each of left side and right side of the guide rail, and left and right guide rollers rotatably mounted on the moving piece around a vertical axial line and an outer periphery of these V-shaped guide rollers are engaged with both sides of the Guide rails.

It is preferable that a position of one of the left and right guide rollers mounted on the moving piece can be freely adjusted in order to adjust the gap between left and right guide rollers.

To increase wear resistance of the guiding means, it is preferable that a wear-resistant hard member is mounted on each of both sides of the guide rail and the guide groove is formed on each of the hard members.

Or, a mounting groove having a cross-sectional shape, in which an inner groove width is wider than a groove width at the opening, may be provided a surface of the V-shaped guide groove and a part an outer periphery is protruded outward, and a piano wire may be mounted on it in the mounting groove so that an outer periphery of the guide roller is brought into contact with the piano wire.

Or, the piston may be designed in such a manner that the magnet couplings and a pair of pressure receiving members positioned on both sides are bendably connected each other, and the moving piece may be designed in a manner that a pair of scrapers positioned at both sides of the magnet couplings have a degree of freedom in the axial direction and the radial direction and that the moving piece may be smoothly moved even when the cylinder tube is curved.

BRIEF DESCRIPTION OF THE DRAWINGS

FIG. 12 is a cross-sectional view along the line B—B in FIG. 11 and.

DETAILED DESCRIPTION OF THE PREFERRED EMBODIMENTS

Figure 1:
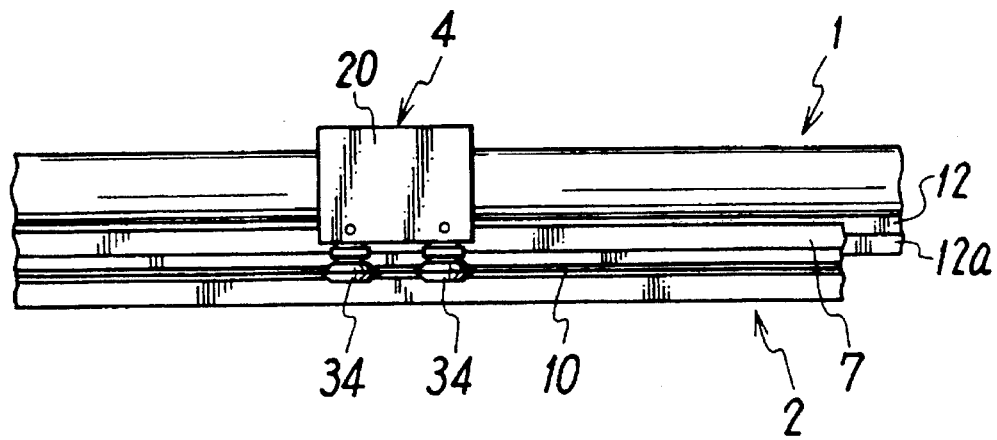
FIG. 1 is a side view of an essential part of an article carrying apparatus of the present invention.
Figure 2:
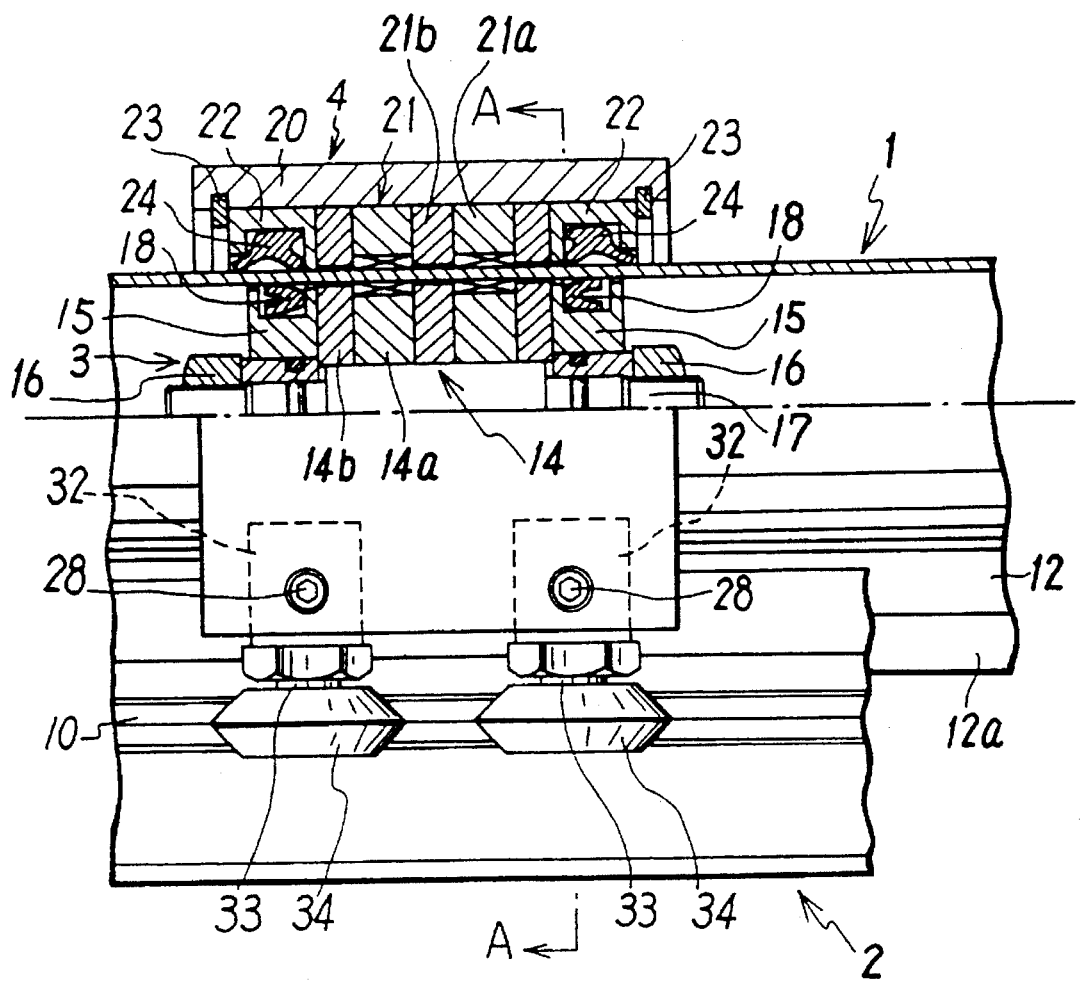
FIG. 2 is an enlarged, partially cutaway side view of the apparatus of FIG. 1.
Figure 3:
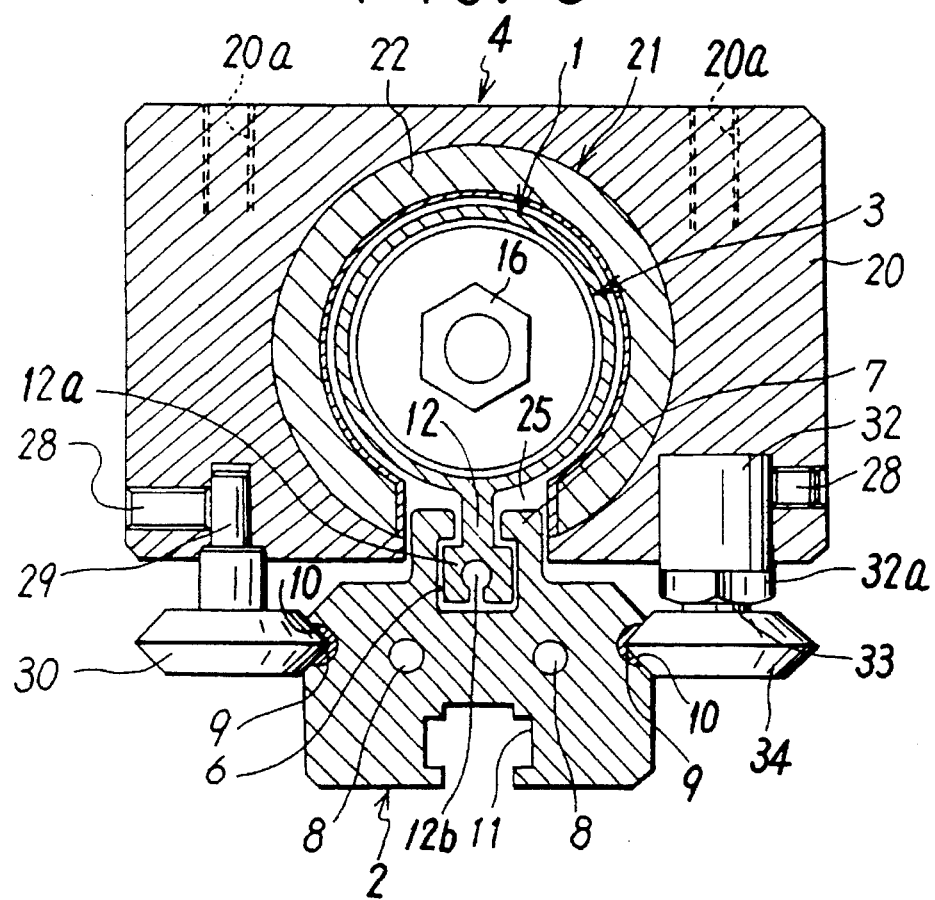
FIG. 3 is a cross-sectional view along the line A—A in FIG. 2.

FIG. 1 to FIG. 3 each represents a first embodiment of an article carrying apparatus of the present invention, which comprises a cylinder tube 1 having a given length, a guide rail 2 extending along the cylinder tube 1, a piston 3 movably mounted in the cylinder tube 1 and moved an action of pressure of a fluid such as compressed air, and a moving piece 4 for carrying an article and movable in one axial direction along the cylinder tube 1 and the guide rail 2.

The guide rail 2 has, on its upper surface, a projected ridge 7 extending in the axial direction, a connection groove 6 arranged at the position of the projected ridge 7 and having an inner groove width wider than the opening of the connection groove 6 and bypass holes 8 and 8 for fluid piping extending in the axial direction in thick portion of the guide rail 2. Further, it is provided with a connection groove 11 extending in the axial direction on its lower surface. All of these components are integrally formed and made of an extrusion material such as aluminum. On the left and right sides of the guide rail 2, wear-resistant hard members 9 and 9 made of hard materials such as hardened steel are fixed in the axial direction by an adequate means such as embedding, and V-shaped guide grooves 10 and 10 are formed on the hard members 9 and 9.

Instead of fixing the hard members 9, guide grooves 10 may be provided on both sides of the guide rail 2 and the groove surface may be processed with surface treatment such as hard coating.

Both ends of the cylinder tube 1 are blocked by end plates (not shown) with ports, and these define a pressure chamber on each side of the piston 3. On the lower surface of the outer periphery of the cylinder tube 1, a connection wall 12 extending in the axial direction is provided. This connection wall 12 has a portion 12a with a wider wall width at its tip, and a groove 12b is formed at the tip of the wider width portion 12a. The cylinder tube 1 and the connection wall 12 are integrally formed by extrusion molding of a non-magnetic material. Together with the connection groove 6 of the guide rail 2, the connection wall 12 constitutes a connection mechanism for connecting the cylinder tube 1 with the guide rail 2, and the connection wall 12 is movably engaged in the connection groove 6 with a certain gap. As a result, the cylinder tube 1 and the guide rail 2 are connected with each other with some degree of freedom so that they may be relatively moved to some extent in upward, downward, leftward or rightward directions.

In the piston 3, magnet couplings 14 having a plurality of annular permanent magnets 14a and yokes 14b arranged alternately in the axial direction and annular adapter plates 15 and 15 arranged on both sides in the axial direction are mounted on a rod 17 by nuts 16 and 16. Piston packings 18 slidably contacting and sealing the inner periphery of the cylinder tube 1 are engaged in a packing groove formed on the outer periphery of each of the adapter plates 15.

The moving piece 4 has a hollow body 20, which is positioned on and strides over the cylinder tube 1. The central portion the of lower bottom of the body 20 is cut away in the axial direction, and both edges of a cutout 25 are positioned close to both sides of the projected ridges 7 on the top of the guide rail 2. Inside the body 20, a magnet coupling 21 and adapter plates 22 and 22 positioned on the both sides in the axial direction are mounted, and the magnet coupling 21 and the adapter plates 22 and 22 are mounted by retaining rings 23 and 23 in such a manner that they can be moved to some extent in the axial direction.

The magnet coupling 21 comprises annular permanent magnets 21a and yokes 21b partially cut away to match a cutout 25 of the body 20 and alternately arranged in axial direction. As they attract the magnet coupling 14 on the piston 3, the moving piece 4 moves after the piston 3. Scrapers 24 and 24 slidably contacting the outer periphery of the cylinder tube 1 are engaged in mounting grooves formed on the inner periphery of the adapter plates 22 and 22.

On the upper surface of the body 20 of the moving piece 4, screw holes 20a for mounting an article such as a workpiece (not shown) or a bracket are provided. On the lower surface of the body 20, a pair of guide rollers 30 and 34 at left and right with a V-shaped outer periphery are mounted in such manner that they can be rotated freely around a vertical axial line, and V-shaped outer peripheries of the guide rollers 30 and 34 are closely engaged in guide grooves 10 and 10 on both sides of the guide rail 2. The guide rollers 30 and 34 and the guide grooves 10 and 10 constitute a guiding means, which guides the moving piece 4 when it moves in the axial direction along the cylinder tube 1. By the engagement of the V-shaped guide rollers 30 and 34 in the V-shaped guide grooves 10 and 10, the movement of the moving piece 4 is restricted so that it can move only in the axial direction, and not in the upward, downward, leftward or rightward directions.

Figure 4:
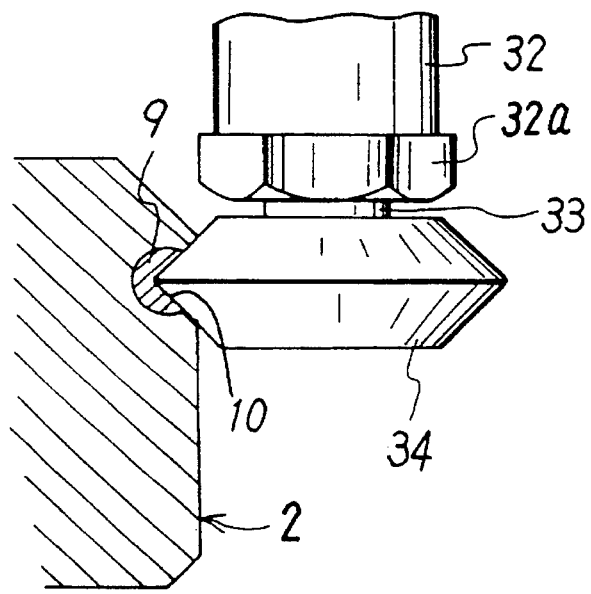
FIG. 4 is an enlarged view of an essential part of FIG. 3.
Figure 5:
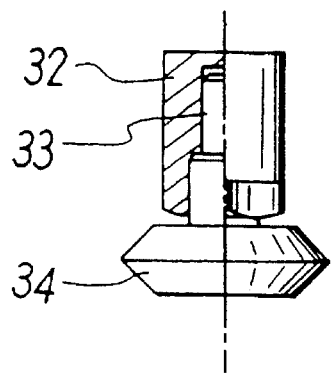
FIG. 5 is a partially cutaway front view of a guide roller shown in FIG. 4.
Figure 6:
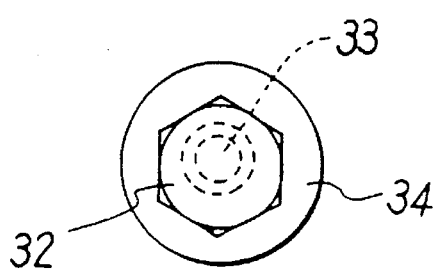
FIG. 6 is a plan view of the guide roller of FIG. 5.

As to the guide rollers 30 and 34, the guide roller 30 is fixed by mounting screws 28 with its roller shaft 29 on the body 20 of the moving piece 4. The roller shaft 33 of the other guide roller 34 is eccentrically mounted on a cap 32 as shown in detail in FIG. 4 to FIG. 6, and the cap 32 is rotatably mounted on the body 20 of the moving piece 4. When the cap 32 is rotated by applying a tool such as a wrench on a nut 32a and by rotating the roller shaft 33 around the axial line of the cap 32, the distance between the guide rollers 30 and 34 can be adjusted to match the width of the guide rail 2. After adjusting the distance, the cap 32 is fixed in the place by the mounting screws 28.

It is preferable that the guide rollers 30 and 34 are manufactured of a wear-resistant material.

In the article carrying apparatus with the above arrangement, when compressed air is supplied to or discharged from the pressure chambers on both sides of the piston 3 in the cylinder tube 1 through the ports (not shown), the piston 3 moves in the cylinder tube 1, and the moving piece 4 is moved, following the movement of the piston 3, by attracting force of the magnet couplings 14 and 21 mounted on the piston 3 and the moving piece 4. Therefore, by holding the article on the moving piece 4, the article can be moved.

In this case, the movement of the moving piece 4 is restricted not to move in any direction other than the axial direction because the V-shaped outer periphery of the rollers 30 and 34 are engaged in the V-shaped guide grooves 10 and 10 on both sides of the guide rail 2, and the moving piece 4 is moved reciprocally in a stable posture along the guide rail 2 and the cylinder tube 1. Accordingly, the posture of the moving piece 4 during its movement remains stable regardless of weight of the workpiece or the setting position thereof.

Because the guide rail 2 and the cylinder tube 1 are connected with each other some degree of freedom, smooth movement of the moving piece 4 is ensured at all times due to a positional relationship between the cylinder tube 1 and the guide rail 2 by the shift of the cylinder tube even though the relation between the moving piece 4 and the guide rail 2 is substantially fixed with respect to the movement in all directions except the axial direction. As a result, the moving piece 4 is in no case caught by the cylinder tube 1 and the movement of the moving place 4 is not restricted. Therefore, high dimensional accuracy is not required for connecting the guide rail 2 with the cylinder tube 1, and this facilitates the manufacture of the article carrying apparatus. In particular, in the case where the cylinder tube 1 and the guide rail 2 are curved, it is possible to ensure the reliable and smooth movement of the moving piece 4 because an error is eliminated by the shift of the cylinder tube 1 in the curved portion.

Further, the hard members 9 may be fixed on both sides of the guide rail 2 and the guide grooves 10 may be provided on the hard members, or the guide grooves 10 may be formed directly on the guide rail 2 and the groove surface may be processed with a hard coating. In so doing, wear resistance of the guide grooves 10 can be increased even when the guide rail 2 is made of a relatively soft material such as aluminum, and this makes it possible to produce a carrying apparatus at a low cost and to ensure a long service life.

The bypass holes 8 and 8 in the guide rail 2 are used as passages for pressure fluid when necessary. In the case where a plurality of guide rails 2 are sequentially connected with each other, these bypass holes can be utilized as insertion holes for connecting pins (not shown). When pressure fluid is passed along the connected guide rails, a hollow pin may be used.

Figure 7:
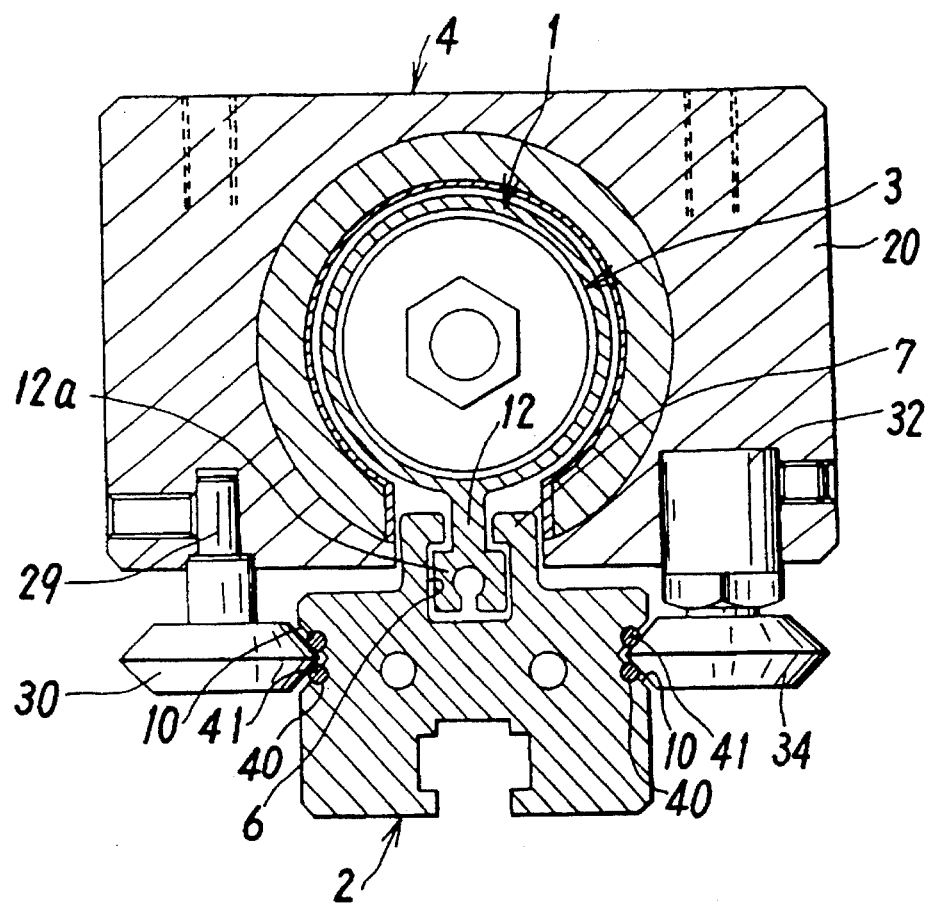
FIG. 7 represents a cross-sectional view similar to FIG. 3, showing a second embodiment of the present invention.

FIG. 7 represents a second embodiment of the present invention. The second embodiment is substantially the same as the first embodiment except the arrangement as described below. Accordingly, the components different from those of the first embodiment are referred by different symbols, while the same components as the first embodiment are referred by the same symbols.

On both sides of the guide rail 2, V-shaped guide grooves 10 and 10 are directly formed. On the two groove surfaces of the guide grooves 10, which crosses each other mounting grooves 40 each a cross-sectional shape of a superior arc longer than one-half of a total circumference are formed respectively in the axial direction. In these mounting grooves 40, piano wires 41 with circular cross-sections are engaged and embedded in the mounting grooves 40 in such a manner that a part of the outer periphery is protruded from the mounting grooves 40 and the remainder is engaged in each of the mounting grooves 40, and the outer peripheral surfaces of the guide rollers 30 and 34 are brought into contact with these piano wires 41. Because the inner width of the mounting grooves 40 is wider than the groove width at the opening, the piano wires 41 are not withdrawn from the opening to the outside.

The piano wires 41 may be integrally embedded when the guide rail 2 is extruded, or they may be inserted into the mounting grooves after the guide rail 2 has been molded, and both ends of the wire or the desired portion may be fixed by an adequate means.

By the use of the piano wire, i.e. high tensile steel wire having high wear resistance, as a guide, even when the guide rail 2 itself is made of a relatively soft material such as aluminum or its alloy, it is possible to prevent wear of the guiding means and to provide to the article carrying apparatus a long service life.

As the piano wires, the commercially available piano wires may be used to reduce the manufacturing cost. Because the wires have high cross-sectional accuracy, the moving piece 4 can be guided at high accuracy.

Further, in the article carrying apparatus, the guide rail 2 and the cylinder tube 1 must be curved in the horizontal or vertical directions in some cases depending upon the places to be installed. In such a case, the guide rail 2 can be easily curved without distortion because the piano wires have circular cross-sections and have no specific directionality to bending.

Figure 8:
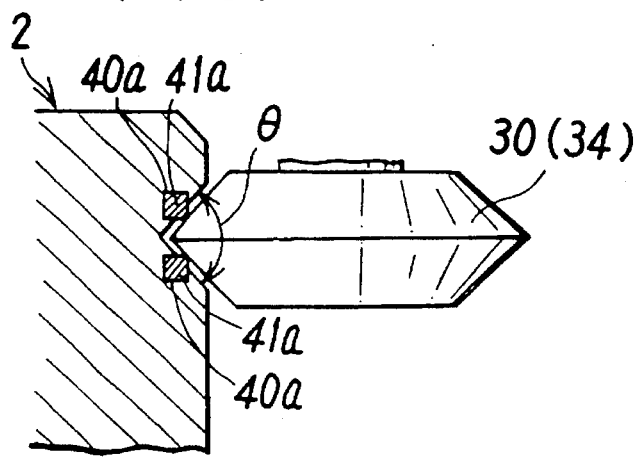
FIG. 8 is a cross-sectional view similar to FIG. 4, showing a third embodiment of the present invention.

FIG. 8 represents an essential portion of a third embodiment of the present invention. This third embodiment differs from the second embodiment in the piano wire 41a has a square cross-section, mounting groove 40a has a square cross-section and its corner is cut away at a position closer to the corner from the center of the square, a corner of one of the piano wire 41a is protruded from the mounting groove 40a and the outer periphery of each of the guide rollers 30 and 34 is brought into contact with the protruding corner.

In the third embodiment, it is possible to easily bend the guide rail 2 in horizontal and vertical directions when the crossing angle θ of a pair of groove surfaces of the guide grooves 10 is designed as a right angle and the piano wire 41a having a square cross-section is mounted in such a manner that two sets of opposing sides of the piano wire run in 41a the horizontal and vertical directions.

Figure 9:
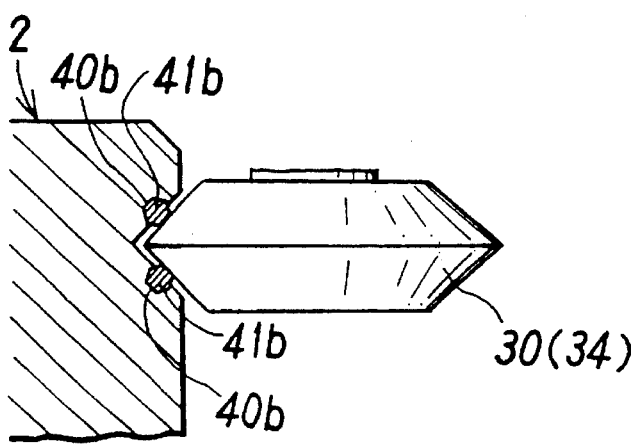
FIG. 9 is a cross-sectional view similar to FIG. 4, showing a fourth embodiment of the present invention.

FIG. 9 shows a fourth embodiment of the invention, which differs from the second embodiment in that the piano wire 41b has a hexagonal cross-section, the mounting groove 40b has a hexagonal cross-section, a part of it is cut away along a line parallel to one side at a position closer to the side from the center of the hexagon, one planar portion on the outer periphery of the piano wire 41b is protruded from the mounting groove 40b, and the outer periphery of each of the guide rollers 30 and 34 is brought into contact with the protruded planar portion. In this fourth embodiment the, groove width at the opening of the mounting groove 40b is smaller than the length of the diagonal line of the hexagon. Thus, the piano wire 41b is not withdrawn through the opening to the outside.

Figure 10:
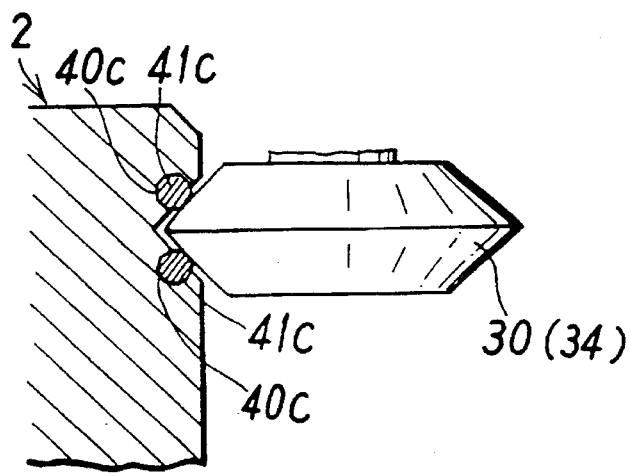
FIG. 10 is a cross-sectional view similar to FIG. 4, showing a fifth embodiment of the present invention.

FIG. 10 represents a fifth embodiment of the present invention, which differs from the fourth embodiment in that the piano wire 41c has an octagonal cross-section, the mounting groove 40c has an octagonal cross-section, a part of which is cut away along a line parallel to a side at a position closer to the side from the center of the octagon, one planar portion of the outer periphery of the piano wire 41c is protruded from the mounting groove 40c, and the outer periphery of each of the guide rollers 30 and 34 is brought into contact with the protruded planar portion. In this fifth embodiment, the piano wire 41c is also not withdrawn through the opening to outside because the groove width at the opening in the mounting groove 40c is smaller than the length of the distance between the opposing two sides of the octagon.

Figure 11:
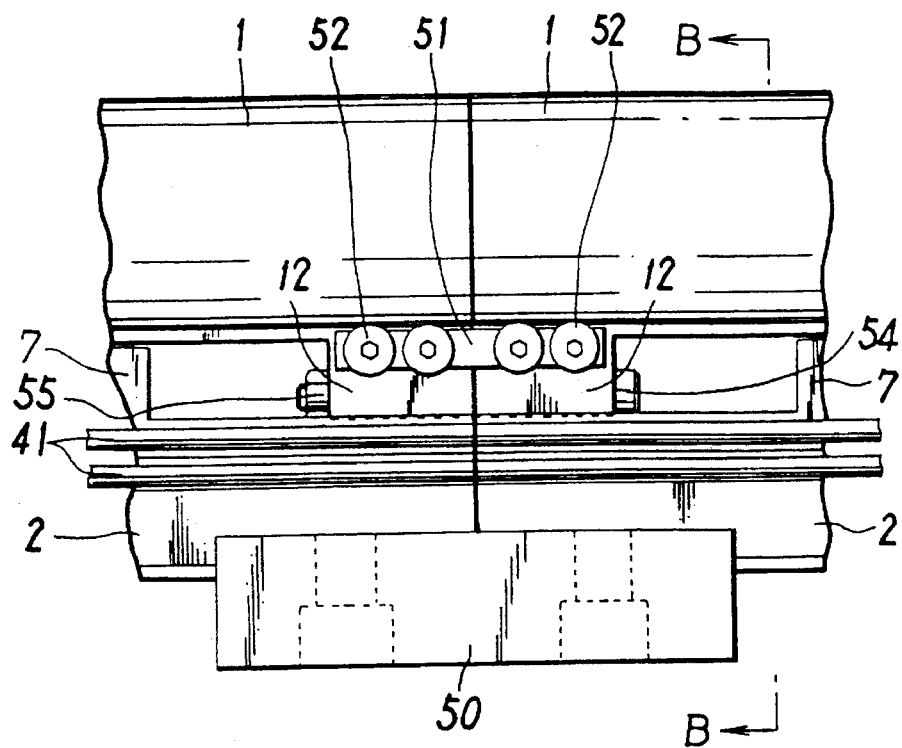
FIG. 11 represents a side view of an essential part, showing connecting procedure of a cylinder tube with a guide roller.
Figure 12:
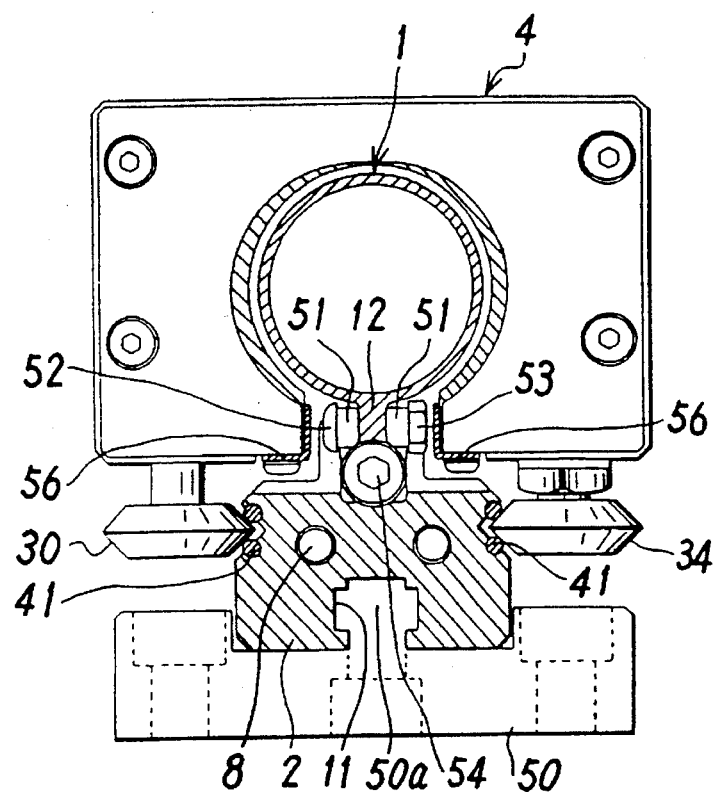

To provide an article carrying apparatus with a longer transport distance, a given number of the cylinder tubes 1 and the guide rails 2 are sequentially connected with each other as shown in FIG. 11 and FIG. 12. In this case, on the lower surface of the junction of the adjacent guide rails 2 and 2, a base 50 is arranged so that it extends to both guide rails 2 and 2. With a connecting portion 50a of the base 50 inserted into connection grooves 11 and 11, the guide rails 2 and 2 and the base 50 are fixed by bolts (not shown). The on connecting ends of the guide rails 2 and 2, the protruded portions are removed as shown in FIG. 11.

On the other hand the end surfaces of the adjacent cylinder tubes 1 and 1 are brought into contact with each other via packings (not shown), and the connection walls 12 and 12, a given length of which is isolated from the end, are brought into contact with each other. Connecting brackets 51 and 51 extending to the cylinder tubes 1 and 1 are brought into contact with both sides of the connection walls 12 and 12 and are secured by a bolt 52 and a nut 53. A bolt 54 is inserted in the axial direction into a groove 12b (FIG. 3) of each of the connection walls 12 and 12, and these are connected each other by tightening the bolt 54 with a nut 55. As a result, the cylinder tubes 1 and 1 are prevented from deviating in the circumferential direction by the brackets 51 and 51, and from deviating in the axial direction by the bolt 54 and the nut 55. In FIG. 12, a reference numeral 56 represents a plate, which holds a cutout 25 of the magnet coupling 21 provided on the moving piece 4.

The piano wires 41 are arranged to extend along a plurality of guide rails 2, while the cross-sectional shape of each of these wires is not limited to a circular shape as shown in the figure, and it is needless to say that a piano wire with a square, hexagonal or octagonal cross-section may be used.

In this way, a plurality of guide rails 2 and a plurality of cylinder tubes 1 with the desired length can be connected each other in the axial direction, and a carrying apparatus with a longer dimension can be manufactured at a lower cost and in an easier manner.

In the case where a plurality of guide rails 2 are connected each other as described above, there is no need to connect all guide rails by the connecting means as described. The guide rails may be connected by piano wires with small gaps between them. In so doing, it is possible to easily bend the guide rails 2.

It is needless to say that the connecting procedure described above can also be applied to the first embodiment.

There is no problem when the cylinder tube 1 of the article carrying apparatus is designed linearly, but when it is curved, it may not be possible to ensure the smooth movement of the piston and the moving piece along the curve due to the relationship between the radius of curve and the length of each of the piston 3 and the moving piece 4.

Figure 13:
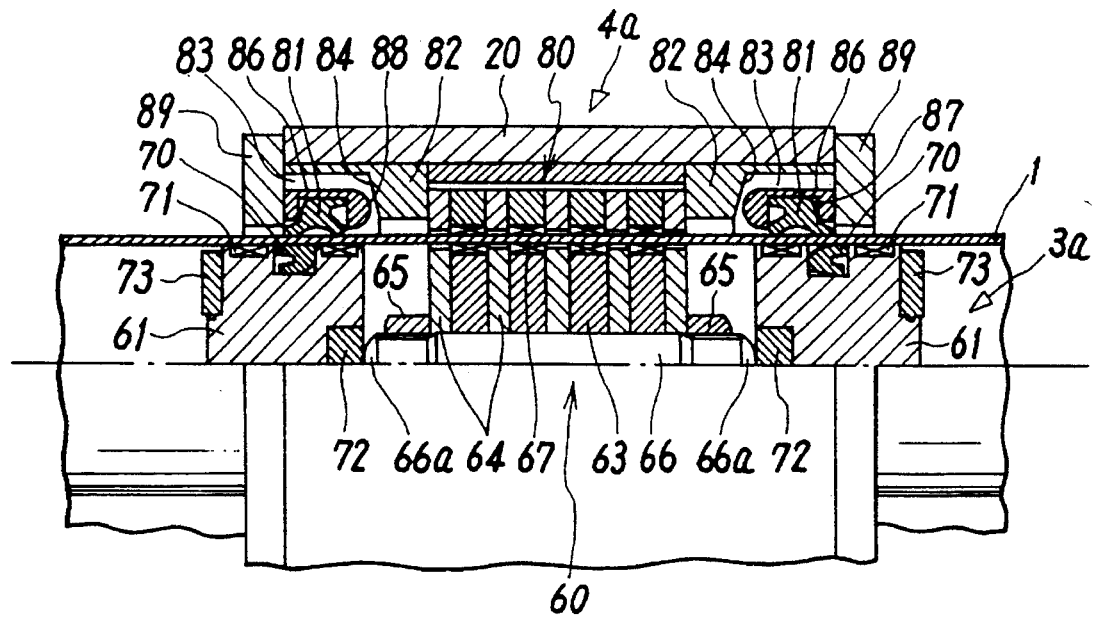
FIG. 13 is a cross-sectional view of the present invention incorporating a plurality of permanent magnets.

In particular, if the number of permanent magnets is increased in order to raise attracting force of the magnet coupling, the length of the magnet coupling is made longer and this leads to a longer length of the sliding portion of the piston 3 and the moving piece 4 along the cylinder tube. For this reason, it is desirable to design an arrangement, in which a smooth movement along the curve is assured even when the sliding portion is longer. FIG. 13 shows an example of a piston 3a and a moving piece 4a of such an arrangement.

Specifically, in FIG. 13, the piston 3a is designed in a separated piston structure, comprising a magnet coupling 60 and a pair of pressure receiving members 61 and 61 separately arranged from the magnet coupling 60.

The, magnet coupling 60 comprises a plurality of permanent magnets 63 and yokes 64 alternately arranged in an annular form in the axial direction, and these are fixed on a central shaft 66 by nuts 65 and 65. Both ends of the central shaft 66 are protruding outwardly beyond the outermost yoke 64, and tips 66a are formed in a spherical form. The reference numeral 67 represents a wear ring.

The pressure receiving member 61 is made of a non-magnetic material such as aluminum, and a packing 70 for sealing and a wear ring 71 are mounted on its outer periphery. On the central portion of the inner side facing to the magnet coupling 60, an wear-resistant contact member 72 processed by heat treatment such as hardening is fixed, and a tip 66a in a spherical shape of the central shaft 66 touches the contact member 72 on the point contact basis. The reference numeral 73 represents a damper fixed on the outer side of the pressure receiving member 61, and it is to alleviate the impact on the pressure receiving member 61 at stroke the end.

When the piston 3a with the above arrangement moves along the curve of the cylinder tube 1, the magnet coupling 60 and a pair of the pressure receiving members 61 and 61 move together, and these can be bent at an angle along the curve at the contact point of the central shaft 66 contacting the contact member 72. For this reason, even when the sliding portion of the piston 3a is long the, fixed linear sliding portion is limited to the portion, which corresponds to the magnet coupling 60 and the pressure receiving member 61. Its length is short, and it is possible to ensure smooth movement of the piston 3a along the curve of the cylinder tube 1.

In the above embodiment, the magnet coupling 60 and a pair of pressure receiving members 61 and 61 simply contact each other via the central shaft 66 and the contact member 72, while these may by connected each other by an adequate means.

On the other hand, in the moving piece 4a, by providing scrapers 81 on both sides of the magnet coupling 80 with degree of freedom the sliding portion can be substantially deformed to match the curve of the cylinder tube 1.

Specifically, on both sides of the magnet coupling 80 in the axial direction, adapter plates 82 and 82 are mounted respectively, and each of the adapter plates 82 has a space 83 for accommodating the scraper 81 on the side opposite to the magnet coupling 80. Inner wall 84 in the axial direction in this space 83 is designed as a tapered wall inclined and spreading outwardly.

In the space 83, the scraper 81 is accommodated as it is held by a holder 86. The holder 86 is designed in an annular shape as a whole, and a mounting groove 87 for mounting the scraper 81 is provided on the inner periphery. An inner surface 88 opposing to the tapered wall 84 is designed in an arcuate shape convexed outwardly. The holder 86 is accommodated in the space 83 with a gap so that it can be freely moved in the axial direction as well as in the radial directions, and it is prevented from being withdrawn from the space 83 by a plate 89, which is mounted at an end of the body 20 of the moving piece 4a.

In the case where the moving piece 4a with the above arrangement moves along the curve of the cylinder tube 1 the sliding portion of the moving piece 4a is substantially deformed along the curve because the holder 86 is relatively shifted in axial direction or in the radial direction or in the both directions in the space 83 with respect to the adapter plate 82 to match the curve or it is tilted with respect to the axial line. For this reason, even when the distance between the two scrapers 81 and 81 is long, the fixed linear sliding portion is limited to the portion corresponding to the magnet coupling 80. As a result, it is possible to ensure smooth movement of the moving piece 4a along the curve of the cylinder tube 1. Moreover, smooth movement of the moving piece 4a along the curve is ensured because the arcuate inner surface 88 of the holder 86 positioned ahead of the advancing direction of the moving piece 4a is brought into contact with the tapered wall 84 and is moved toward a direction optimally fitted to the curve.

In the article carrying apparatus according to the present invention, the movement of the moving piece is restricted in all directions but the axial direction, and the moving piece can be moved with a stable posture along the guide rail and the cylinder tube regardless of the weight of the workpiece or the position to be installed.

Because the guide rail and the cylinder tube are connected each other with a certain degree of freedom, even when the moving piece is supported in such a state that the movement in all directions but in the axial direction is restricted by the guide rail, smooth movement of the moving piece is assured by the shift of the cylinder tube, and the moving piece is not caught by the cylinder tube and smooth movement is assured.

What we claim are:

1. An article carrying apparatus, comprising:

a cylinder tube having a given length, a piston movably arranged in said cylinder tube by action of fluid pressure, a moving piece carrying the article and movably arranged along said cylinder tube, and magnet couplings for the piston and the moving piece mounted on the piston and the moving piece, respectively, and attracting each other, wherein:

said piston is divided into a magnet coupling for the piston and a pair of pressure receiving members positioned on both sides of the piston in an axial direction thereof, and said magnet coupling for the piston and said pair of the pressure receiving members are bendably combined at a connection; and said moving piece comprises a pair of scrapers slidably contacting an outer peripheral surface of the cylinder tube on both sides in an axial direction of the magnet coupling for the moving piece, said scrapers being mounted respectively on annular holders enclosing the cylinder tube, and said holders are mounted on said moving piece with degrees freedom in an axial direction and a radial direction of the moving piece.

2. An article carrying apparatus according to claim 1, wherein said magnet coupling for the piston has a center shaft and a plurality of permanent magnets of a circular disk shape fixed alternately on said center shaft and said yokes, both ends of said center shaft are protruded outwardly from the outer yoke, a tip of the centering shaft is formed with a spherical shape, said two pressure receiving members are made of non-magnetic material, an abrasion-resistant hard contact member is fixed on inner surface of said pressure receiving members, and the spherical tip of said center shaft contacts said contact member on a point-contact basis.

3. An article carrying apparatus according to claim 2, wherein the two holders holding the scrapers on said moving piece are accommodated in a space for adapter plates positioned on both sides of the magnet coupling for the moving piece in such manner and with a gap such that the holders are displaceable in axial direction and radial direction of the moving piece, said plates form tapered walls so that inner walls of the space accommodating said scrapers are inclined and expanded outwardly, and inner surfaces of the holders are positioned face-to-face to said tapered walls and are designed with an arcuate shape which is outwardly convex.

4. An article carrying apparatus according to claim 1, wherein the two holders holding the scrapers on said moving piece are accommodated in a space for adapter plates positioned on both sides of the magnet coupling for the moving piece in such manner and with a gap such that the holders are displaceable in axial direction and radial direction of the moving piece, said plates form tapered walls so that inner walls of the space accommodating said scrapers are inclined and expanded outwardly, and inner surfaces of the holders are positioned face-to-face to said tapered walls and are designed with an arcuate shape which is outwardly convex.

* * * * *